(12) United States Patent
Li et al.

(10) Patent No.: US 9,001,407 B2
(45) Date of Patent: Apr. 7, 2015

(54) BIAS VOLTAGE CONTROL SYSTEM AND BIAS VOLTAGE CONTROL METHOD

(71) Applicant: Wuhan Research Institute of Posts and Telecommunications, Wuhan (CN)

(72) Inventors: Cai Li, Wuhan (CN); Qi Yang, Wuhan (CN); Zhu Yang, Wuhan (CN); Shaohua Yu, Wuhan (CN)

(73) Assignee: Wuhan Research Institute of Posts and Telecommunications, Wuhan (CN)

( * ) Notice: Subject to any disclaimer, the term of this patent is extended or adjusted under 35 U.S.C. 154(b) by 0 days.

(21) Appl. No.: 14/132,285

(22) Filed: Dec. 18, 2013

(65) Prior Publication Data
US 2014/0168741 A1   Jun. 19, 2014

(30) Foreign Application Priority Data
Dec. 18, 2012   (CN) .......................... 2012 1 0551721

(51) Int. Cl.
*G02F 1/01* (2006.01)
*H04B 10/50* (2013.01)
*H04B 10/556* (2013.01)

(52) U.S. Cl.
CPC ........ *G02F 1/0123* (2013.01); *H04B 10/50575* (2013.01); *H04B 10/5561* (2013.01)

(58) Field of Classification Search
USPC .................................. 359/237–239, 276, 279
See application file for complete search history.

(56) References Cited

U.S. PATENT DOCUMENTS

2013/0141772 A1* 6/2013 Jiang .............................. 359/276

* cited by examiner

*Primary Examiner* — Tuyen Tra
(74) *Attorney, Agent, or Firm* — Dentons US LLP

(57) ABSTRACT

A bias voltage control system and method for an optical IQ modulator are disclosed. The optical IQ modulator includes an I-branch Mach-Zehnder Modulator (MZM) to which an I-branch bias voltage is applied, a Q-branch MZM to which a Q-branch bias voltage is applied, and an optical phase shifter to which an orthogonal bias voltage is applied. The system comprises a photo-detector converting at least a part of an optical signal output by the optical IQ modulator to an electrical signal; an analog-to-digital converter converting the electrical signal to a digital signal; and a digital signal processor superimposing a first dither signal and a second dither signal on the I-branch bias voltage and the Q-branch bias voltage respectively to generate a first order harmonic signal and a second order harmonic signal, and controlling the bias voltages according to powers of a DC component, and the first and second order harmonic signals.

16 Claims, 3 Drawing Sheets

BIAS VOLTAGE CONTROL SYSTEM AND BIAS VOLTAGE CONTROL METHOD

CROSS REFERENCE TO RELATED APPLICATIONS

This application claims the benefit under 35 U.S.C. §119 (a) of the prior Chinese Patent Application CN 201210551721.2, filed in the State Intellectual Property Office of the P.R.C. on Dec. 18, 2012, the entire disclosure of which is hereby incorporated by reference in its entirety.

TECHNICAL FIELD

The present disclosure relates to the field of optical signal modulation in an optical communication system, and more particularly, to a bias voltage control system for an optical IQ modulator and a bias voltage control method for the same.

BACKGROUND

In an optical communication system, an optical IQ modulator based on a Mach-Zehnder Modulator (MZM) is usually adopted to generate a high-order-modulated optical signal. However, factors, such as temperature, will affect stability of the optical IQ modulator, so that an offset occurs in a quiescent operating point of the optical IQ modulator, resulting in deterioration of system's performance. In order to guarantee that a signal quality does not affect the system's performance, it is necessary to monitor and control a DC bias voltage of the optical IQ modulator, so that the optical IQ modulator operates at an optimal quiescent operating point. Furthermore, in order to guarantee mutual orthogonality between an I-branch signal and a Q-branch signal, it is also necessary to adjust a bias voltage of an optical phase shifter to an optimum value. Many studies have been performed on such issues. For example, for a single carrier system based on Quadrature Phase Shift Keying (QPSK) and 16-Quadrature Amplitude Modulation (16-QAM), a method for monitoring and controlling the bias voltage thereof based on an asymmetric dither technology has been proposed. For the single carrier system, the bias voltage control can also be performed by using differential phase information.

With increasing popularity of 100G optical communication technologies, an Optical Orthogonal Frequency Division Multiplexing (O-OFDM) technology has been widely used. However, the study on the bias voltage control for the OFDM system is currently insufficient, and only a few documents disclosed controlling the bias voltage by detecting a power of an output optical signal of the OFDM modulator. Most of existing methods for single carrier bias voltage control and OFDM bias voltage control adopt a manner of power detection. However, actual researches show that although these methods are feasible in theory, the power of the optical signal does not change obviously in an area around the optimal quiescent operating point, and device noises are apt to cause a failure of controlling the bias voltage at an optimum point, leading to a loss of the system performance.

SUMMARY

An objective of the present disclosure is to provide a bias voltage control system and method for an optical IQ modulator, which can control a bias voltage of the optical IQ modulator at an optimum point, so that there is approximately no distortion in a signal output by the optical IQ modulator, and thus a loss of the system performance is reduced.

According to an aspect of the present disclosure, there is provided a bias voltage control system for an optical IQ modulator. The optical IQ modulator includes an I-branch MZM to which an I-branch bias voltage is applied and which performs I-modulation on incident light, a Q-branch MZM to which a Q-branch bias voltage is applied and which performs Q-modulation on the incident light, and an optical phase shifter to which an orthogonal bias voltage is applied and which is connected in series with the I-branch MZM or the Q-branch MZM to perform a phase shift on an output thereof. The bias voltage control system comprises a photo-detector configured to convert at least a part of an optical signal output by the optical IQ modulator to an electrical signal; an analog-to-digital converter configured to convert the electrical signal to a digital signal; a digital signal processor configured to superimpose a first dither signal on the I-branch bias voltage and superimpose a second dither signal on the Q-branch bias voltage so as to generate a first order harmonic signal and a second order harmonic signal in the digital signal, and control the I-branch bias voltage, the Q-branch bias voltage and the orthogonal bias voltage according to powers of a DC component, the first order harmonic signal and the second order harmonic signal of the digital signal.

According to another aspect of the present disclosure, there is provided a bias voltage control method for an optical IQ modulator. The optical IQ modulator includes an I-branch MZM to which an I-branch bias voltage is applied and which performs I-modulation on an incident light, a Q-branch MZM to which a Q-branch bias voltage is applied and which performs Q-modulation on the incident light, and an optical phase shifter to which an orthogonal bias voltage is applied and which is connected in series with the I-branch MZM or the Q-branch MZM to perform a phase shift on an output thereof. The bias voltage control method comprises converting at least a part of an optical signal output by the optical IQ modulator to an electrical signal; converting the electrical signal to a digital signal; superimposing a first dither signal on the I-branch bias voltage and superimposing a second dither signal on the Q-branch bias voltage so as to generate a first order harmonic signal and a second order harmonic signal in the digital signal, and controlling the I-branch bias voltage, the Q-branch bias voltage and the orthogonal bias voltage according to powers of a DC component, the first order harmonic signal and the second order harmonic signal of the digital signal.

In an embodiment of the present disclosure, there is further provided an automatic bias voltage control system for an optical IQ modulator, which includes an optical IQ modulator, a coupler, a photo-detector, and a digital signal processor. An I-branch MZM and a Q-branch MZM are provided respectively on two arms of the optical IQ modulator, and the Q-branch MZM is further connected with an optical phase shifter. An output of the I-branch MZM and an output of the optical phase shifter are coupled by a coupler as an output optical signal. The photo-detector detects a part of energy of the output optical signal and converts it to an electrical signal. After sampled by an analog-to-digital converter, the electrical signal is inputted to the digital signal processor, and the digital signal processor adjusts an I-branch bias voltage for the I-branch MZM, an Q-branch bias voltage for the Q-branch MZM and an orthogonal bias voltage for the optical phase shifter, respectively by three digital-to-analog converters.

In another embodiment of the present disclosure, there is further provided a control method for an automatic bias voltage control system for an optical IQ modulator, which comprises S1, maintaining a Q-branch bias voltage and an orthogonal bias voltage unchanged, roughly adjusting an I-branch bias voltage, recording, by a digital signal processor, a sampled signal (i.e. a digital signal) transmitted by an analog-to-digital converter until a power of a DC component of the sampled signal reaches a minimum value, maintaining the I-branch bias voltage at this moment (i.e., at the time when the power of the DC component of the sampled signal is minimum), then roughly adjusting the Q-branch bias voltage, and maintaining the Q-branch bias voltage at the time when the power of the DC component is minimum; S2, superimposing a first dither signal on the I-branch bias voltage, and superimposing a second dither signal on the Q-branch bias voltage, where amplitudes of the two dither signals do not exceed 10% of an average signal amplitude of an OFDM system, and frequencies of the two dither signals are less than a frequency interval between adjacent carriers in the OFDM system; S3, changing the orthogonal bias voltage, so that the digital signal processor obtains a second order harmonic signal with a frequency which is twice the frequency of the dither signal and records a power thereof, and fixing the orthogonal bias voltage at the time when the power of the second order harmonic signal is minimum; S4, maintaining the I-branch bias voltage or the Q-branch bias voltage unchanged, respectively, and changing the other bias voltage, so that the digital signal processor obtains a first order harmonic signal with a frequency, which is equal to the frequency of the dither signal and records a power thereof, and maintain the other bias voltage at the time when the power is minimum.

Based on the above technical solution in S1, incident light may be transmitted into the I-branch MZM and the Q-branch MZM respectively, both of which modulate a real part and an imaginary part of an input electrical signal to an optical domain, respectively; an output signal of the Q-branch MZM passes through an optical phase shifter, and then is coupled with an output signal of the I-branch MZM by a coupler as an output optical signal; a photo-detector converts a detected energy of the optical signal to an electrical signal; the electrical signal passes through the analog-to-digital converter and is outputted as a sampled signal (i.e. digital signal), and the sampled signal is transmitted into a digital signal processor for processing.

Based on the above technical solution, three digital-to-analog converters connected to the digital signal processor set initial voltage values respectively, and outputs of the three digital-to-analog converters may correspond to the I-branch MZM, the Q-branch MZM, and the optical phase shifter, respectively, so as to control the I-branch bias voltage, the Q-branch bias voltage, and the orthogonal bias voltage.

Based on the above technical solution in S1, the bias voltage corresponding to the minimum value of the power of the DC component of the sampled signal may have an error of ±5% as compared with an optimal bias voltage.

Based on the above technical solution in S1, the I-branch bias voltage and the Q-branch bias voltage may be roughly adjusted within adjustable ranges of the I-branch bias voltage and the Q-branch bias voltage respectively.

Based on the above technical solution in S3, when the orthogonal bias voltage is fixed, an angle of the optical phase shifter may reach an optimal value of n/2.

Based on the above technical solution in S4, the digital signal processor maintains the voltage outputted to the Q-branch MZM unchanged and changes the voltage outputted to the I-branch MZM, filters the sampled signal by using a filter with a central frequency, which is the same as the frequency of the dither signal to obtain the first order harmonic signal with the frequency, which is the same as the frequency of the dither signal, records a corresponding power of the first order harmonic signal, adjusts a voltage outputted to the I-branch MZM to obtain the I-branch bias voltage corresponding to a minimum value of the first order harmonic signal, which may be the optimal I-branch bias voltage.

Based on the above technical solution in S4, the digital signal processor maintains the voltage outputted to the I-branch MZM unchanged and changes the voltage outputted to the Q-branch MZM, filters the sampled signal by using the filter with a central frequency, which is the same as the frequency of the dither signal so as to obtain the first order harmonic signal with the frequency which is the same as the frequency of the dither signal, records a power of the first order harmonic signal, adjusts the voltage outputted to the Q-branch MZM to obtain the Q-branch bias voltage corresponding to the minimum value of the first order harmonic signal which may be the optimal Q-branch bias voltage.

With the above method and system, the low-frequency dither signals may be superimposed on the I-branch bias voltage and the Q-branch bias voltage respectively, then the powers of the DC component, the first order harmonic signal and the second order harmonic signal of the sampled signal are monitored respectively to control the I-branch bias voltage, the Q-branch bias voltage, and the orthogonal bias voltage precisely, so that there is nearly no distortion in the signal output by the optical IQ modulator, and the loss of the system performance is reduced. Since the frequencies of the superimposed dither signals are staggered from a carrier frequency of an OFDM signal, and the amplitudes of the superimposed dither signals are very small as compared with that of the OFDM signal, the noise brought by the superimposed dither signal can almost be ignored. In addition, the bias voltage control system according to the embodiment of the present disclosure is simple in structure, and can realize a precise control of the bias voltage by using low-speed electrical devices.

DETAILED DESCRIPTION

The embodiments of the present disclosure are further described in detail below in conjunction with the accompanying drawings.

Figure 1:
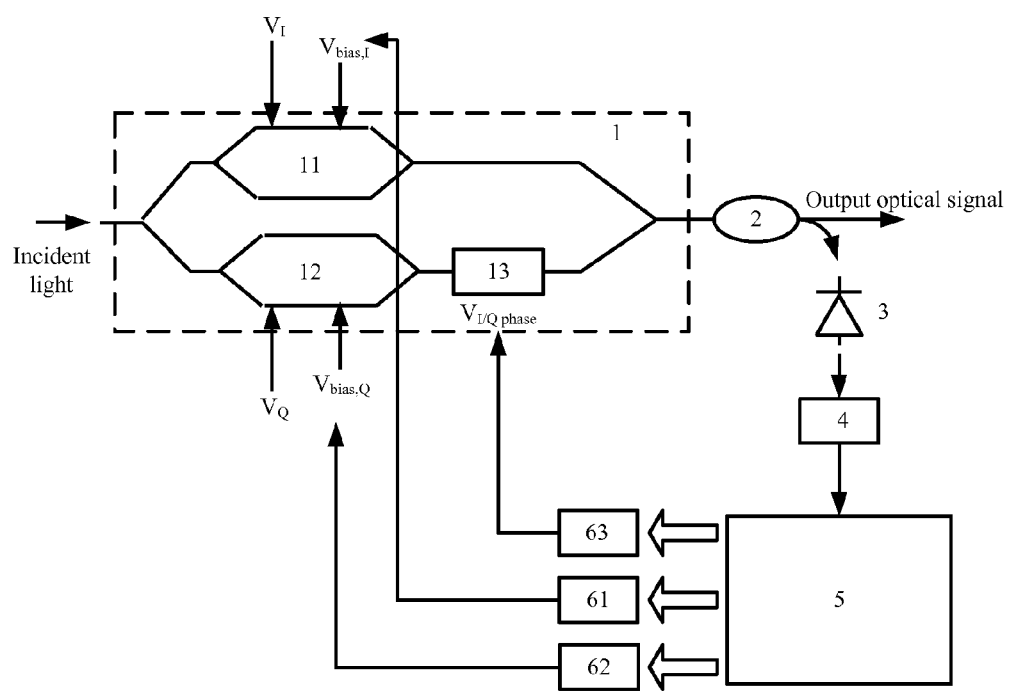
FIG. 1 is a schematic structural diagram of a bias voltage control system for an optical IQ modulator according to an embodiment of the present disclosure.

As shown in FIG. 1, an automatic bias voltage control system for an optical IQ modulator, according to the embodiment of the present disclosure, may include the optical IQ modulator 1, a coupler 2, a photo-detector (PD) 3, an analog-to-digital converter 4, and a digital signal processor 5, and may further include digital-to-analog converters 61-63. It is to be appreciated that, although the bias voltage control system in the present embodiment includes the optical IQ modulator 1, this is not limitative, and in other embodiments, the bias voltage control system may be independent of the optical IQ modulator 1, and may be connected to the optical IQ modulator 1 to control bias voltages thereof.

The optical IQ modulator 1 may perform IQ modulation on incident light by using an input electrical signal. An I-branch MZM 11 and a Q-branch MZM 12 are provided respectively on two arms of the optical IQ modulator 1, and the Q-branch MZM 12 is connected with an optical phase shifter 13. An I-branch bias voltage is applied to the I-branch MZM 11, and the I-branch MZM 11 can perform I-modulation on the incident light. A Q-branch bias voltage is applied to the Q-branch MZM 12, and the he Q-branch MZM 12 can perform Q-modulation on the incident light. An orthogonal bias voltage is applied to the optical phase shifter 13, and the optical phase shifter 13 can perform a phase shift on an optical signal. An output of the optical IQ modulator 1 is connected with the coupler 2. It is to be appreciated that, although in the present embodiment the optical phase shifter 13 is disposed on the arm where the Q-branch MZM 12 is located and is connected with the Q-branch MZM 12, this is not limitative, and in other embodiments, the optical phase shifter 13 may also be disposed on the arm where the I-branch MZM 11 is located and is connected with the I-branch MZM 11.

The coupler 2 may couple an output of the I-branch MZM 11 with an output of the optical phase shifter 13, and output a resulting optical signal. It is to be appreciated that, although the coupler 2 is described to be disposed outside the optical IQ modulator 1, this is not limitative; it may be disposed inside the optical IQ modulator 1 and become a part of the optical IQ modulator 1.

The photo-detector 3 may detect a part of energy of the optical signal output by the coupler 2, to convert at least a part of the output optical signal to an electrical signal.

The analog-to-digital converter 4 may sample the electrical signal to convert it to a digital signal, which is transmitted into the digital signal processor 5.

The digital signal processor 5 may adjust the I-branch bias voltage for the I-branch MZM 11 through the first digital-to-analog converter 61, adjust the Q-branch bias voltage for the Q-branch MZM 12 through the second digital-to-analog converter 62, and adjust the orthogonal bias voltage for the optical phase shifter 13 through the third digital-to-analog converter 63. For example, the digital signal processor 5 may generate the I-branch bias voltage, the Q-branch bias voltage and the orthogonal bias voltage in digital format, which are converted to analog signals by the digital-to-analog converters 61-63 respectively, and then applied to the I-branch MZM 11, the Q-branch MZM 12, and the optical phase shifter 13, respectively. In the embodiment of the present disclosure, briefly, the digital signal processor 5 may superimpose a first dither signal on the I-branch bias voltage, and superimpose a second dither signal on the Q-branch bias voltage, to generate a first order harmonic signal and a second order harmonic signal in the digital signal, and then control the I-branch bias voltage, the Q-branch bias voltage, and the orthogonal bias voltage according to powers of a DC component, the first order harmonic signal and the second order harmonic signal of the digital signal.

Hereinafter, operations of the bias voltage control system, according to the embodiment of the present disclosure, will be described.

The incident light entering the optical IQ modulator 1 is divided into two branches, which are transmitted respectively into the I-branch MZM 11 and Q-branch MZM 12 on the two arms of the optical IQ modulator 1. As mentioned above, the I-branch bias voltage for the I-branch MZM 11 is controlled by the digital signal processor 5 through the first digital-to-analog converter 61, and the Q-branch bias voltage for the Q-branch MZM 12 is controlled by the digital signal processor 5 through the second digital-to-analog converter 62. The I-branch MZM 11 modulates an imaginary part $V_I$ of the input electrical signal to an optical domain, and the Q-branch MZM 12 modulates a real part $V_Q$ of the input electrical signal to the optical domain. Afterwards, the output signal of the Q-branch MZM 12 enters the optical phase shifter 13. The digital signal processor 5 controls the orthogonal bias voltage applied to the optical phase shifter 13 through the third digital-to-analog converter 63, to control the output signal of the optical phase shifter 13 to be orthogonal with the output signal of the I-branch MZM 11. The output signal of the I-branch MZM 11 and the output signal of the optical phase shifter 13 are coupled by the coupler 2 to form an output optical signal, and a light field intensity $E_0$ of the optical signal may be expressed as:

$$E_o = \frac{E_i}{2}\left[\cos\left(\frac{\pi}{2}\frac{V_I + V_{bias,I}}{V_\pi}\right) + \cos\left(\frac{\pi}{2}\frac{V_Q + V_{bias,Q}}{V_\pi}\right)e^{-j\phi_{IQ}}\right] \quad \text{Equation 1}$$

where $V_{bias,I}$ denotes the DC bias voltage for the I-branch MZM 11, $V_{bias,Q}$ denotes the DC bias voltage for the Q-branch MZM 12, $V_\pi$ denotes a half-wave voltage of the optical IQ modulator 1, $\phi_{IQ}$ denotes a phase angle of the optical phase shifter 13, which is controlled by the orthogonal bias voltage $V_{I/Q\,phase}$, and $E_i$ denotes a light field intensity of the incident light. A power of the electrical signal output by the photo-detector 3 is in direct proportion to a power of the optical signal output by the coupler 2. The sampled signal (i.e. digital signal) $P_o$ generated by sampling the electrical signal by the analog-to-digital converter 4 may be expressed as:

$$P_o = \frac{P_i}{8}\left[2 + \cos\left(\frac{\pi}{2}\frac{V_I + V_{bias,I}}{V_\pi}\right) + \cos\left(\frac{\pi}{2}\frac{V_Q + V_{bias,Q}}{V_\pi}\right) + 4\cos\left(\frac{\pi}{4}\frac{V_I + V_{bias,I}}{V_\pi}\right)\cos\left(\frac{\pi}{4}\frac{V_Q + V_{bias,Q}}{V_\pi}\right)\cos\phi_{IQ}\right]; \quad \text{Equation 2}$$

where $P_i$ denotes the power of the incident light, and $P_i \propto |E_i|^2$.

Initially, the digital signal processor 5 may apply the bias voltages with initial values to the I-branch MZM 11, the Q-branch MZM 12 and the optical phase shifter 13 through the three digital-to-analog converters, respectively.

Next, the digital signal processor 5 may adjust the I-branch bias voltage and the Q-branch bias voltage from their initial values to a first I-branch bias voltage value and a first Q-branch bias voltage value, respectively. Specifically, the digital signal processor 5 may control the Q-branch bias voltage to be unchanged through the second digital-to-analog converter 62, control the orthogonal bias voltage to be unchanged through the third digital-to-analog converter 63, and adjust the I-branch bias voltage within an adjustable range of the I-branch bias voltage (i.e. 0-$2V_\pi$, where $V_\pi$ is the half-wave voltage of the optical IQ modulator 1). The digital signal processor 5 may process the sampled signal $P_o$ from the analog-to-digital converter 4 after each adjustment, records the power of the DC component of each sampled signal $P_o$, until the power of the DC component of the sampled signal $P_o$ is a minimum value, and maintains the I-branch bias voltage value (i.e. the first I-branch bias voltage value) at this time (i.e., at the time when the power of the DC component of the sampled signal $P_o$ is the minimum value). Then, the digital signal processor 5 may maintain the I-branch bias voltage (i.e., the first I-branch bias voltage value) output by the first digital-to-analog converter 61 unchanged, maintains the orthogonal bias voltage unchanged, and adjust the Q-branch bias voltage within an adjustable range of the Q-branch bias voltage (0-2V$_\pi$). The digital signal processor 5 may process the sampled signal P$_o$ from the analog-to-digital converter 4 after each adjustment, record the power of the DC component of each sampled signal P$_o$, until the power of the DC component of the sampled signal P$_o$ is a minimum value, and maintain the Q-branch bias voltage value (i.e., the first Q-branch bias voltage value) at this time (i.e., at the time when the power of the DC component of the sampled signal P$_o$ is the minimum value). Since the power of the DC component of the sampled signal P$_o$ near optimal values of the bias voltages changes slowly and noises exist, the bias voltages corresponding to the monitored minimum values of the power of the DC component may have an error of ±5% as compared with the optimal bias voltages.

Next, the digital signal processor 5 may superimpose a first dither signal wires V$_{dith}$ cos($\omega_{dith}$t). on the I-branch bias voltage, and superimpose a second dither signal V$_{dith}$ sin($\omega_{dith}$t) on the Q-branch bias voltage. Both of the two dither signals are low-frequency small-dither signals, where amplitudes V$_{dith}$ of the two dither signals do not exceed a predetermined proportion (e.g. 10%) of an average signal amplitude of an OFDM system, and frequencies $\omega_{dith}$ of the two dither signals are less than a frequency interval between adjacent carriers in the OFDM system.

Next, the digital signal processor 5 may maintain the outputs of the first digital-to-analog converter 61 and the second digital-to-analog converter 62 unchanged, that is, maintain the I-branch bias voltage on which the first dither signal is superimposed and the Q-branch bias voltage on which the second dither signal is superimposed unchanged, and adjust the orthogonal bias voltage through the third digital-to-analog converters 63 within an adjustable range of the orthogonal bias voltage. The digital signal processor 5 may filter the sampled signal P$_o$ obtained after each adjustment through, for example, a digital band-pass filter (which may be included in the digital signal processor 5, and is not shown in the figure) with a center frequency 2$\omega_{dith}$ which is twice the frequency of the dither signal, so as to obtain the second order harmonic signal with a frequency 2$\omega_{dith}$ which is twice the frequency of the dither signal, and records the power of the second order harmonic signal, until the power reaches a minimum value. Then, the digital signal processor 5 may fix the output voltage of the third digital-to-analog converter 63 at this time, i.e., the orthogonal bias voltage value corresponding to the minimum value of the power of the second order harmonic signal, and at this moment, the corresponding angle of the optical phase shifter 13 may reach the optimal value π/2. The orthogonal bias voltage value thus determined may be used as the optimal orthogonal bias voltage value to be finally applied to the optical phase shifter 13.

Next, the digital signal processor 5 may maintain the orthogonal bias voltage unchanged at the optimal value, and maintain the Q-branch bias voltage unchanged at the previously obtained first I-branch bias voltage value on which the first dither signal V$_{dith}$ sin($\omega_{dith}$t) is superimposed, that is, the digital signal processor 5 may maintain the voltage outputted to the Q-branch MZM 12 unchanged, and adjust the voltage outputted to the I-branch MZM 11. The digital signal processor 5 may filter the sampled signal P$_o$ obtained after each adjustment through, for example, a digital band-pass filter (which may be included in the digital signal processor 5, and is not shown in the figure) with a center frequency $\omega_{dith}$ which is the same as the frequency of the dither signal, so as to obtain the first order harmonic signal, and record the power of the first order harmonic signal, until the power of the first order harmonic signal reaches a minimum value. Then, the digital signal processor 5 may fix the voltage outputted from the first digital-to-analog converter 61 to the I-branch MZM 11 at this time, i.e., the I-branch bias voltage corresponding to the minimum value of the power of the first order harmonic signal, as the optimal I-branch bias voltage value to be finally applied to the I-branch MZM 11.

Next, the digital signal processor 5 may maintain the orthogonal bias voltage unchanged at the optimal value, maintain the voltage outputted to the I-branch MZM 11 unchanged (i.e., maintain the voltage at the optimal I-branch bias voltage on which the second dither signal is superimposed), and adjust the voltage outputted to the Q-branch MZM 12. The digital signal processor 5 may filter the sampled signal P$_o$ obtained after each adjustment through the above digital band-pass filter with the center frequency $\omega_{dith}$ which is the same as the frequency of the dither signal, so as to obtain the first order harmonic signal, record the power of the first order harmonic signal, until the power of the first order harmonic signal reaches a minimum value, and then fix the voltage outputted from the second digital-to-analog converter 62 to the Q-branch MZM 12, i.e., the Q-branch bias voltage corresponding to the minimum value of the power of the first order harmonic signal, as the optimal Q-branch bias voltage value to be finally applied to the Q-branch MZM 12.

With the above system, a precise control on the bias voltages for the optical IQ modulator may be realized. In addition, the system is simple in structure, and can be implemented by using low-speed electrical devices.

It is to be appreciated that, although it is mentioned above that the digital signal processor 5 is provided with a special filter to filter the digital signal, this is not limitative, and it is also possible not to provide the special filter, in which case the digital signal may be processed by the digital signal processor 5 directly in the way commonly known in the art to remove unwanted signal components.

Hereinafter, an automatic bias voltage control method for the optical IQ modulator according to the embodiment of the present disclosure is described with reference to FIG. 2 and in combination with FIG. 1. The method can be executed by the above bias voltage control system. Since most details of the method have been mentioned above, a brief description of the method is provided herein.

Briefly, in the bias voltage control method according to the embodiment of the present disclosure, at least part of an optical signal output by the optical IQ modulator is converted to an electrical signal, the electrical signal is converted to a digital signal, a first dither signal is superimposed on an I-branch bias voltage and a second dither signal is superimposed on an Q-branch bias voltage so as to generate a first order harmonic signal and a second order harmonic signal in the digital signal, and then the I-branch bias voltage, the Q-branch bias voltage and an orthogonal bias voltage are controlled according to powers of a DC component, the first order harmonic signal and the second order harmonic signal of the digital signal.

Figure 2:
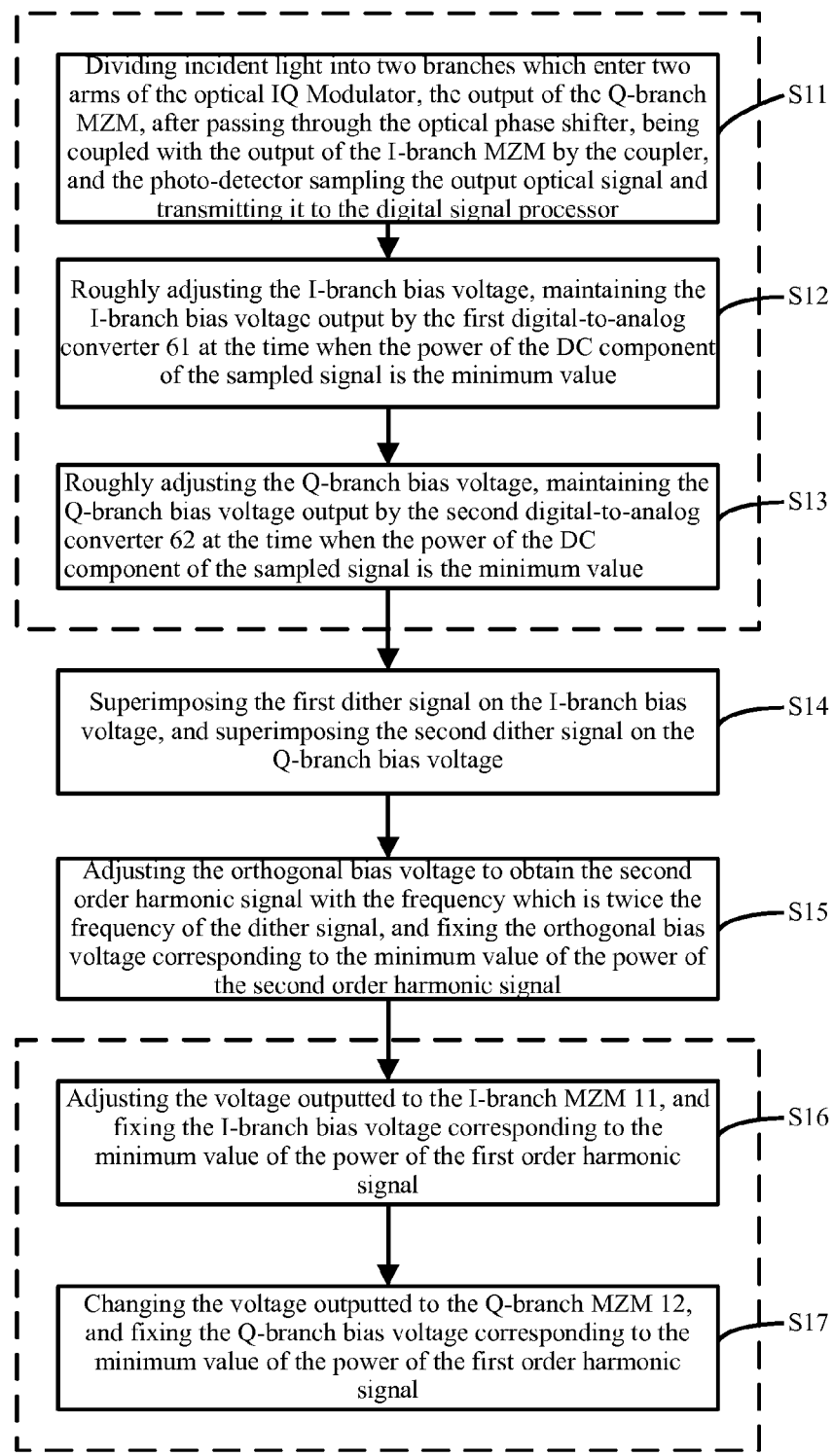
FIG. 2 is a flow chart of a bias voltage control method for an optical IQ modulator according to an embodiment of the present disclosure.

Specifically, as shown in FIG. 2, in Step S11, incident light is divided to two branches, which are transmitted respectively into the I-branch MZM 11 and the Q-branch MZM 12 on the two arms of the optical IQ modulator 1. The I-branch MZM 11 modulates an imaginary part V$_I$ of an input electrical signal to the optical domain, and the Q-branch MZM 12 modulates a real part V$_Q$ of the input electrical signal to the optical domain. Afterwards, an output signal of the Q-branch MZM 12 enters the optical phase shifter 13. An output signal of the I-branch MZM 11 and an output signal of the optical phase shifter 13 are coupled by the coupler 2 to form an output optical signal, which can be expressed by the above Equation 1. The photo-detector 3 converts at least a part of the output optical signal to an electrical signal. The analog-to-digital converter 4 samples the electrical signal and outputs a sampled signal $P_o$, which can be expressed by the above Equation 2. It is to be noted that when the optical IQ modulator 1 is not included in the bias voltage control system as described above, Step S11 is not included in the bias voltage control method, either.

In Step S12, initially, the digital signal processor 5 applies bias voltages with initial values to the I-branch MZM 11, the Q-branch MZM 12, and the optical phase shifter 13 through three digital-to-analog converters, respectively. Next, the digital signal processor 5 controls the Q-branch bias voltage unchanged through the second digital-to-analog converter 62, controls the orthogonal bias voltage unchanged through the third digital-to-analog converter 63, and adjusts the I-branch bias voltage within the adjustable range of the I-branch bias voltage $(0-2V_\pi)$. The digital signal processor 5 processes the sampled signal $P_o$ from the analog-to-digital converter 4 after each adjustment, records the power of the DC component of each sampled signal $P_o$, until the power of the DC component of the sampled signal $P_o$ is a minimum value, and maintains (i.e. fixes) the I-branch bias voltage value at this time (i.e., the first I-branch bias voltage value described above).

In Step S13, the digital signal processor 5 maintains the I-branch bias voltage (i.e., the first I-branch bias voltage value) output by the first digital-to-analog converter 61 unchanged, maintains the orthogonal bias voltage unchanged, and adjusts the Q-branch bias voltage within the adjustable range of the Q-branch bias voltage $(0-2V_\pi)$. The digital signal processor 5 processes the sampled signal $P_o$ from the analog-to-digital converter 4 after each adjustment, records the power of the DC component of each sampled signal $P_o$, until the power of the DC component of the sampled signal $P_o$ is a minimum value, and maintains (i.e. fixes) the Q-branch bias voltage value output by the second digital-to-analog converter 62 at this time (i.e., the first Q-branch bias voltage value described above).

In Step S14, the digital signal processor 5 superimposes the first dither signal on the I-branch bias voltage, and superimposes the second dither signal on the Q-branch bias voltage.

In Step S15, the digital signal processor 5 maintains the outputs of the first digital-to-analog converter 61 and the second digital-to-analog converter 62 unchanged, that is, maintains the I-branch bias voltage on which the first dither signal is superimposed and the Q-branch bias voltage on which the second dither signal is superimposed unchanged, and adjusts the orthogonal bias voltage through the third digital-to-analog converter 63 within the adjustable range of the orthogonal bias voltage. The digital signal processor 5 filters the sampled signal $P_o$ obtained after each adjustment through, for example, the digital band-pass filter with the center frequency $2\omega_{dith}$ which is twice the frequency of the dither signal, so as to obtain the second order harmonic signal with the frequency $2\omega_{dith}$ which is twice the frequency of the dither signal, records the power of the second order harmonic signal, until the power reaches the minimum value, and then fixes the output voltage of the third digital-to-analog converter 63 at this time, i.e., the orthogonal bias voltage value corresponding to the minimum value of the power of the second order harmonic signal, as the optimal orthogonal bias voltage value to be finally applied to the optical phase shifter 13.

In Step S16, the digital signal processor 5 maintains the orthogonal bias voltage unchanged at the optimal value, maintains the Q-branch bias voltage unchanged at the first I-branch bias voltage value on which the first dither signal is superimposed, and adjusts the voltage outputted to the I-branch MZM 11. The digital signal processor 5 filters the sampled signal $P_o$ obtained after each adjustment through, for example, the digital band-pass filter with the center frequency $\omega_{dith}$ which is the same as the frequency of the dither signal, so as to obtain the first order harmonic signal, records the power of the first order harmonic signal, until the power of the first order harmonic signal reaches the minimum value, and then fixes (i.e. maintains) the voltage outputted from the first digital-to-analog converter 61 to the I-branch MZM 11 at this time, i.e., the I-branch bias voltage corresponding to the minimum value of the power of the first order harmonic signal, as the optimal I-branch bias voltage value to be finally applied to the I-branch MZM 11.

In Step S17, the digital signal processor 5 maintains the orthogonal bias voltage unchanged at the optimal value, maintains the voltage outputted to the I-branch MZM 11 unchanged (i.e., maintains it at the optimal I-branch bias voltage on which the second dither signal is superimposed), and adjusts the voltage outputted to the Q-branch MZM 12. The digital signal processor 5 filters the sampled signal $P_o$ obtained after each adjustment through the digital band-pass filter with the center frequency $\omega_{dith}$ which is the frequencies of the dither signal to obtain the first order harmonic signal, records the power of the first order harmonic signal, until the power of the first order harmonic signal reaches the minimum value, and then fixes the voltage outputted from the second digital-to-analog converter 62 to the Q-branch MZM 12 at this time, i.e., the Q-branch bias voltage corresponding to the minimum value of the power of the first order harmonic signal, as the optimal Q-branch bias voltage value to be finally applied to the Q-branch MZM 12.

With the above method, the I-branch bias voltage, the Q-branch bias voltage and the orthogonal bias voltage may be controlled precisely, so that there is approximately no distortion n the signal output by the optical IQ modulator, and the loss of the system performance is reduced. Since the frequencies of the superimposed dither signals are staggered from the carrier frequency of the OFDM signal, and the amplitudes thereof are very small as compared with that of the OFDM signal, the noise brought thereby can be ignored.

Hereinafter, the system, according to the embodiment of the present disclosure, is further described by an experiment example.

In the present experiment example, an OFDM system based on 4-QAM modulation is selected, and 80 subcarriers are used, where 3 subcarriers in a DC part are vacant. An OFDM signal is obtained by 128-point Fast Inverse Fourier Transform, with a cyclic prefix of 1/16 and a baseband signal rate of 10 GS/s. The frequencies of the first dither signal and the second dither signal superimposed on the bias voltages of the optical IQ modulator are 10 MHz, the amplitudes thereof occupy 10% of the average amplitude of an OFDM signal, and the half-wave voltage of the optical IQ modulator is 5.8V.

On the receiving side, a radio-frequency signal output by the photo-detector is sampled by a 12.5 GS/s real-time oscilloscope, and digital signal processing is performed on the sampled signal. Specifically, two digital band-pass filters with a bandwidth of 1 MHz are respectively used to filter out a first order harmonic signal component and a second order harmonic signal component, to remove disturbance from other harmonic signal components. Experiment results show that the bias voltages are successfully controlled at the optimal points precisely by using the above system and method according to the embodiments of the present disclosure.

Figure 3:
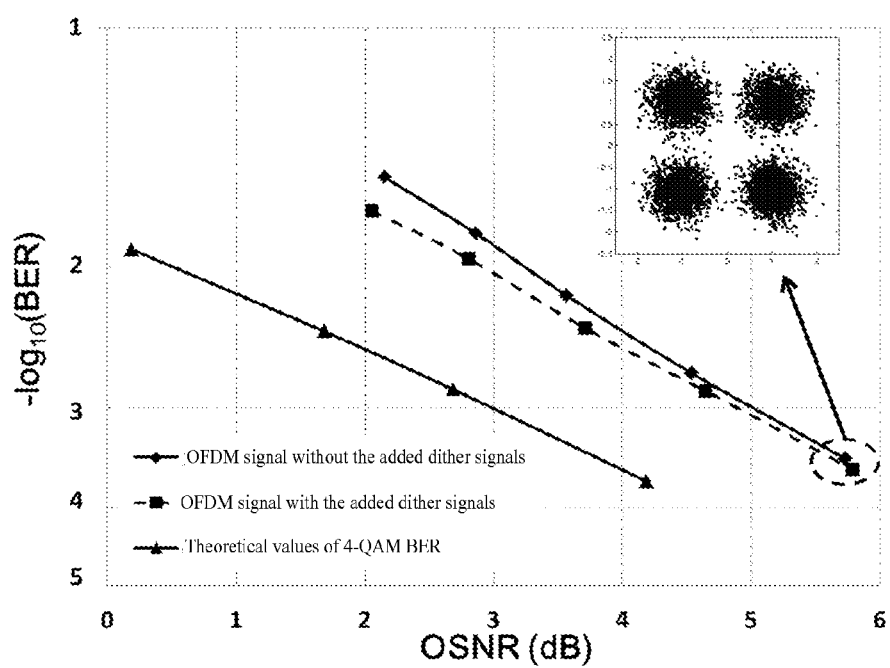
FIG. 3 is a schematic diagram of a bit error rate (BER) performance obtained by controlling the bias voltage by using the method according to the embodiment of the present disclosure.

Moreover, in order to illustrate an influence of the disturbing signals on a transmission quality, a back-to-back bit error rate (BER) of the OFDM signal is measured with and without disturbance respectively, as shown in FIG. 3. In order to ensure a decoding threshold, a BER value, which is required in theory, is $10^{-3}$, and a corresponding optical signal to noise ratio (OSNR) is 3 dB. Experiment results show that, in order to ensure the BER value lower than $10^{-3}$, the OSNR measured without disturbance is 4.8 dB, the OSNR measured with disturbance is 5.0 dB, and a difference between the two OSNRs is 0.2 dB. The difference of 0.2 dB is caused by the powers of the added sine and cosine signals, thus it is seen that a SNR cost caused by the added disturbing signals may be ignored.

The present disclosure has been described above with reference to particular embodiments thereof. It is to be appreciated that the present disclosure is not limited to the above embodiments. Those skilled in the art may make various improvements and modifications without departing from the principle of the present disclosure, and such improvements and modifications fall in the scope of the present disclosure.

What is claimed is:

1. A bias voltage control system for an optical IQ modulator, the optical IQ modulator including an I-branch Mach-Zehnder Modulator to which an I-branch bias voltage is applied and which performs I-modulation on incident light, a Q-branch Mach-Zehnder Modulator to which a Q-branch bias voltage is applied and which performs Q-modulation on the incident light, and an optical phase shifter to which an orthogonal bias voltage is applied and which is connected in series with the I-branch Mach-Zehnder Modulator or the Q-branch Mach-Zehnder Modulator to perform a phase shift on an output thereof, the bias voltage control system comprising:

a photo-detector configured to convert at least a part of an optical signal output by the optical IQ modulator to an electrical signal;

an analog-to-digital converter configured to convert the electrical signal to a digital signal; and a digital signal processor configured to superimpose a first dither signal on the I-branch bias voltage and superimpose a second dither signal on the Q-branch bias voltage thereby generating a first order harmonic signal and a second order harmonic signal in the digital signal, and control the I-branch bias voltage, the Q-branch bias voltage and the orthogonal bias voltage according to powers of a DC component, the first order harmonic signal and the second order harmonic signal of the digital signal.

2. The bias voltage control system of claim 1, wherein the optical IQ modulator is applied in an Optical Orthogonal Frequency Division Multiplexing (O-OFDM) system, amplitudes of the first dither signal and the second dither signal do not exceed a predetermined proportion of an average signal amplitude of the O-OFDM system, and frequencies of the first dither signal and the second dither signal are less than a frequency interval between adjacent carriers of the O-OFDM system.

3. The bias voltage control system of claim 2, wherein the predetermined proportion is 10%.

4. The bias voltage control system of claim 2, wherein the digital signal processor superimposes the first dither signal on the I-branch bias voltage and superimposes the second dither signal on the Q-branch bias voltage by:

adjusting the I-branch bias voltage and the Q-branch bias voltage from their initial values to a first I-branch bias voltage value and a first Q-branch bias voltage value, respectively; and superimposing the first dither signal on the adjusted I-branch bias voltage, and superimposing the second dither signal on the adjusted Q-branch bias voltage.

5. The bias voltage control system of claim 4, wherein the digital signal processor determines the first I-branch bias voltage value and the first Q-branch bias voltage value by:

maintaining the Q-branch bias voltage and the orthogonal bias voltage unchanged, and adjusting the I-branch bias voltage, so as to determine an I-branch bias voltage value at the time when the power of the DC component of the digital signal is minimum, as the first I-branch bias voltage value; and maintaining the orthogonal bias voltage unchanged, maintaining the I-branch bias voltage as the first I-branch bias voltage value, and adjusting the Q-branch bias voltage, so as to determine a Q-branch bias voltage value at the time when the power of the DC component of the digital signal is minimum, as the first Q-branch bias voltage value.

6. The bias voltage control system of claim 5, wherein the digital signal processor controls the I-branch bias voltage, the Q-branch bias voltage and the orthogonal bias voltage according to the powers of the DC component, the first order harmonic signal and the second order harmonic signal of the digital signal by:

maintaining the I-branch bias voltage on which the first dither signal is superimposed and the Q-branch bias voltage on which the second dither signal is superimposed unchanged, and changing the orthogonal bias voltage, so as to determine the orthogonal bias voltage at the time when the power of the second order harmonic signal is minimum, as a final orthogonal bias voltage;

maintaining the I-branch bias voltage on which the first dither signal is superimposed unchanged, maintaining the orthogonal bias voltage at the final orthogonal bias voltage, and adjusting the Q-branch bias voltage on which the second dither signal is superimposed, so as to determine the Q-branch bias voltage at the time when the power of the first order harmonic signal is minimum, as a final Q-branch bias voltage; and maintaining the orthogonal bias voltage at the final orthogonal bias voltage, maintaining the Q-branch bias voltage at the final Q-branch bias voltage on which the second dither signal is superimposed, and adjusting the I-branch bias voltage on which the first dither signal is superimposed, so as to determine the I-branch bias voltage at the time when the power of the first order harmonic signal is minimum, as a final I-branch bias voltage.

7. The bias voltage control system of claim 6, wherein the I-branch bias voltage is adjusted within an adjustable range of the I-branch bias voltage, and the Q-branch bias voltage is adjusted within an adjustable range of the Q-branch bias voltage.

8. The bias voltage control system of claim 7, wherein the adjustable range of the I-branch bias voltage and the adjustable range of the Q-branch bias voltage are $0$-$2V_\pi$, where $V_\pi$ is a half-wave voltage of the optical IQ modulator.

9. A bias voltage control method for an optical IQ modulator, the optical IQ modulator including an I-branch Mach-Zehnder Modulator to which an I-branch bias voltage is applied and which performs I-modulation on incident light, a Q-branch Mach-Zehnder Modulator to which a Q-branch bias voltage is applied and which performs Q-modulation on the incident light, and an optical phase shifter to which an orthogonal bias voltage is applied and which is connected in series with the I-branch Mach-Zehnder Modulator or the Q-branch Mach-Zehnder Modulator to perform a phase shift on an output thereof, the bias voltage control method comprising:

converting at least part of an optical signal output by the optical IQ modulator to an electrical signal;
converting the electrical signal to a digital signal;
superimposing a first dither signal on the I-branch bias voltage, and superimposing a second dither signal on the Q-branch bias voltage, so as to generate a first order harmonic signal and a second order harmonic signal in the digital signal; and
controlling the I-branch bias voltage, the Q-branch bias voltage and the orthogonal bias voltage according to powers of a DC component, the first order harmonic signal and the second order harmonic signal of the digital signal.

10. The bias voltage control method of claim 9, wherein the optical IQ modulator is applied in an Optical Orthogonal Frequency Division Multiplexing (O-OFDM) system, amplitudes of the first dither signal and the second dither signal do not exceed a predetermined proportion of an average signal amplitude of the O-OFDM system, and frequencies of the first dither signal and the second dither signal are less than a frequency interval between adjacent carriers of the O-OFDM system.

11. The bias voltage control method of claim 10, wherein the predetermined proportion is 10%.

12. The bias voltage control method of claim 10, wherein the superimposing a first dither signal on the I-branch bias voltage and superimposing a second dither signal on the Q-branch bias voltage includes:

adjusting the I-branch bias voltage and the Q-branch bias voltage from their initial values to a first I-branch bias voltage value and a first Q-branch bias voltage value, respectively; and
superimposing the first dither signal on the adjusted I-branch bias voltage, and superimposing the second dither signal on the adjusted Q-branch bias voltage.

13. The bias voltage control method of claim 12, wherein the first I-branch bias voltage value and the first Q-branch bias voltage value are determined by:

maintaining the Q-branch bias voltage and the orthogonal bias voltage unchanged, and adjusting the I-branch bias voltage, so as to determine an I-branch bias voltage value at the time when the power of the DC component of the digital signal is minimum, as the first I-branch bias voltage value; and
maintaining the orthogonal bias voltage unchanged, maintaining the I-branch bias voltage as the first I-branch bias voltage value, and adjusting the Q-branch bias voltage, so as to determine a Q-branch bias voltage value at the time when the power of the DC component of the digital signal is minimum, as the first Q-branch bias voltage value.

14. The bias voltage control method of claim 13, wherein the controlling the I-branch bias voltage, the Q-branch bias voltage and the orthogonal bias voltage according to the powers of the DC component, the first order harmonic signal and the second order harmonic signal of the digital signal includes:

maintaining the I-branch bias voltage on which the first dither signal is superimposed and the Q-branch bias voltage on which the second dither signal is superimposed unchanged, and changing the orthogonal bias voltage, so as to determine the orthogonal bias voltage at the time when the power of the second order harmonic signal is minimum, as a final orthogonal bias voltage;
maintaining the I-branch bias voltage on which the first dither signal is superimposed unchanged, maintaining the orthogonal bias voltage at the final orthogonal bias voltage, and adjusting the Q-branch bias voltage on which the second dither signal is superimposed, so as to determine the Q-branch bias voltage at the time when the power of the first order harmonic signal is minimum, as a final Q-branch bias voltage; and
maintaining the orthogonal bias voltage at the final orthogonal bias voltage, maintaining the Q-branch bias voltage at the final Q-branch bias voltage on which the second dither signal is superimposed, and adjusting the I-branch bias voltage on which the first dither signal is superimposed thereby determining the I-branch bias voltage at the time when the power of the first order harmonic signal is minimum, as a final I-branch bias voltage.

15. The bias voltage control method of claim 14, wherein the I-branch bias voltage is adjusted within an adjustable range of the I-branch bias voltage, and the Q-branch bias voltage is adjusted within an adjustable range of the Q-branch bias voltage.

16. The bias voltage control method of claim 15, wherein the adjustable range of the I-branch bias voltage and the adjustable range of the Q-branch bias voltage are $0$-$2V_\pi$, where $V_\pi$ is a half-wave voltage of the optical IQ modulator.

* * * * *